US006798458B1

(12) United States Patent
Unemura

(10) Patent No.: US 6,798,458 B1
(45) Date of Patent: Sep. 28, 2004

(54) IMAGE SIGNAL CONVERSION EQUIPMENT

(75) Inventor: Toyoaki Unemura, Itami (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/555,605

(22) PCT Filed: Sep. 29, 1999

(86) PCT No.: PCT/JP99/05341

§ 371 (c)(1),
(2), (4) Date: May 31, 2000

(87) PCT Pub. No.: WO00/21288

PCT Pub. Date: Apr. 13, 2000

(30) Foreign Application Priority Data

Oct. 1, 1998 (JP) .......................................... 10-279690

(51) Int. Cl.$^7$ ............................ H04N 11/20; H04N 7/01
(52) U.S. Cl. ........................ 348/448; 348/443; 348/458
(58) Field of Search ................................ 348/443, 448, 348/449, 458, 554, 556, 558, 911; H04N 7/01, 11/20, 3/27

(56) References Cited

U.S. PATENT DOCUMENTS

| 5,627,598 | A | * | 5/1997 | Tsuchida | .................... 348/556 |
| 6,144,412 | A | * | 11/2000 | Hirano et al. | ................ 348/441 |
| 6,177,946 | B1 | * | 1/2001 | Sinclair et al. | ............. 345/501 |
| 6,433,832 | B2 | * | 8/2002 | Watanabe et al. | ........... 348/554 |

FOREIGN PATENT DOCUMENTS

| JP | 58-81386 | 5/1983 |
| JP | 60-153276 | 8/1985 |
| JP | 2-205180 | 8/1990 |
| JP | 3-110981 | 5/1991 |
| JP | 4-263293 | 9/1992 |
| JP | 4-116481 | 10/1992 |
| JP | 4-116482 | 10/1992 |
| JP | 5-122627 | 5/1993 |
| JP | 6-98275 | 4/1994 |
| JP | 6-237424 | 8/1994 |
| JP | 7-295530 | 11/1995 |
| JP | 8-251504 | 9/1996 |
| JP | 10-234009 | 9/1998 |

* cited by examiner

Primary Examiner—Michael H. Lee
Assistant Examiner—Trang U. Tran
(74) Attorney, Agent, or Firm—Wenderoth, Lind & Ponack, L.L.P.

(57) ABSTRACT

In an image signal converter (ICp1) converting a component video signal (Scv) of an interlaced scanning format for image display on a display device for an image signal of a progressive scanning format (Scv, p) for image display on the display device, an up-converter (11) converts the component video signal (Scv) of the interlaced scanning format into the one of the progressive scanning format. A scanning format determination part (4, 14, 15) determines based on a luminance signal (Y) included in the component video signal (Scv1, Scv2) whether the component video signal (Scv1, Scv2) is of the interlaced or progressive scanning format. Based on the determination result of the scanning format determination part (15), an output destination selector (3B, 15A) selects an output destination of the component video signal (Scv1, Scv2). When the scanning format determination part (15) determines that the format is the interlaced scanning format, the component video signal (Scv1, Scv2) is supplied to the up-converter (11).

6 Claims, 8 Drawing Sheets

FIG. 7

MSG1

1080i IS ENTERED.
NOT COMPLIANT.

MSG2

NOT COMPLIANT.
HORIZONTAL FREQUENCY  79.9 KHz
VERTICAL FREQUENCY      74 Hz

IMAGE SIGNAL CONVERSION EQUIPMENT

TECHNICAL FIELD

The present invention relates to image signal converters converting each of component video signals of different scanning formats to be supplied to a display device such as a television receiver into signals of a common scanning format.

BACKGROUND ART

A schematic structure of a conventional image signal converter incorporated in a television receiver such as a high-definition TV is shown in FIG. 8. A conventional image signal converter ICc includes an input terminal 1, a color-difference signal demodulator 2, a selector 3, a sync separator 4, an RGB processor 5, and a display 6.

The input terminal 1 receives a first component video signal Scv1 including a luminance signal Y, a color-difference signal PB and a color-difference signal PR outputted from an external video/audio data source, typically a digital television STB (Set-top Box) or DVD player. The input terminal 1 then supplies each of the luminance signal Y, the color-difference signal PB and the color-difference signal PR included in the first component video signal Scv1 to the selector 3.

The color-difference signal demodulator 2 generates a second component video signal Scv2 composed of a luminance signal Y, a color-difference signal U (=B−Y), and a color-difference signal V (=R−Y) from a luminance signal Y and a chroma signal C obtained based on a composite video signal of any television standard system (in this example, the NTSC system). The luminance signal Y, the color-difference signal U and the color-difference signal V (R−Y) of the second component video signal are each supplied to the selector 3. Note that the luminance signal Y and the chroma signal C to be supplied to the color-difference signal demodulator 2 are obtained from, for example, an NTSC composite video signal supplied by a Y/C separator (not shown) after Y/C separation or an output from the so-called S terminal of a video tape recorder.

The selector 3 selectively outputs either the first component video signal Scv1 (Y, PB, PR) from the input terminal 1 or the second component video signal Scv2 (Y, U, V) from the color-difference signal demodulator 2. Note that this selection of the component video signal is made by the selector 3 based on a selecting signal Sw externally provided.

The sync separator 4 is implemented by a sync separator circuit, which separates and extracts a horizontal synchronization signal H-SYNC and a vertical synchronization signal V-SYNC from the luminance signal Y included in the first or second component video signal Scv1 or Scv2 supplied by the selector 3.

The RGB processor 5 is implemented by an RGB demodulator circuit, which demodulates the first component video signal Scv1 Y, PB, PR) or the second component video signal Scv2 (Y, U, V) and outputs the original color signals of R, G, and B.

An image is displayed on the display 6 based on the each of the color signals R. G, and B received from the RGB processor 5.

The operation of image signal conversion by the above image signal converter ICc is briefly described below. A user operates a remote controller (not shown) to supply the selector 3 with the selecting signal Sw for providing an instruction of selecting either the first or second component video signal Scv1 or Scv2 and outputting the selected component video signal to the RGB processor 5.

When the external device such as a digital television STB and DVD player is connected to the input terminal 1, the selector 3 outputs the first component video signal Scv1 received from the input terminal 1 based on the selecting signal Sw. Otherwise, the selector 3 outputs the second component video signal Scv2 received from the color-difference signal demodulator 2 based on the selecting signal Sw.

The first component video signal Scv1 (Y, PB, PR) supplied to the input terminal 1 is outputted to the selector 3 without any processing. If supported by an NTSC interlaced scanning format of approximately 480 valid display scanning lines per frame (hereinafter referred to as "480i format"), the first component video signal Scv1 (Y, PB, PR) is supplied to the RGB processor 5 through the selector 3. Note that the luminance signal Y included in the first component video signal Scv 1 is supplied also to the sync separator 4.

On the other hand, when the video signal of the NTSC 480i format is supplied to the color-difference signal demodulator 2 in a state that its luminance signal Y and chroma signal C have already been separated, the color-difference demodulator 2 demodulates these incoming signals and then outputs the second component video signal Scv2 composed of the luminance signal Y and the color-difference signals U and V. In this case, as described above, the selector 3 is switched in advance so as to output the second component video signal Scv2 received from the color-difference signal demodulator 2. The second component video signal Scv2 is supplied through the selector 3 to the RGB processor 5, and the luminance signal Y included therein is supplied to the sync separator 4.

The sync separator 4 separates and extracts the horizontal synchronization signal H-SYNC and the vertical synchronization signal V-SYNC from the received luminance signal Y. These extracted synchronization signals H-SYNC and V-SYNC are supplied to a deflector (not shown) in the display 6.

The RGB processor 5 demodulates the first component video signal Scv1 (Y, PB, PR) or the second component video signal Scv2 (Y, U, V) to obtain original color signals of R, G, and B. These demodulated color signals are supplied to the display 6.

As such, when the first component video signal of the 480i format is supplied by the input terminal 1, or when the luminance signal Y and the chroma signal C of the 480i format are supplied to the color-difference signal demodulator 2, a color image can be displayed on the display 6.

However, in the image signal converter ICc, if a video signal of a scanning format other than the 480i format is supplied to the input terminal 1 as the first component video signal Scv1 (Y, PB, PR), it is impossible to correctly display a color image of the first component video signal Scv1 supplied to the display 6.

For example, in some cases, the first component video signal Scv1 (Y, PB, PR) is supported by a progressive scanning format of approximately 480 valid display scanning lines per frame (hereinafter referred to as "480p" format). Since being a non-interlaced scanning, the progressive scanning format is different from the 480i format in the number of valid display scanning lines per field. Therefore, the display 6 cannot display an image of the 480p first component video signal Scv1 supplied to the RGB processor 5 based on the horizontal and vertical synchronization signals H-SYNC and V-SYNC extracted by the sync separator 4.

As such, in the image signal converter ICc, the image of the first component video signal Scv1 cannot be correctly displayed except when the input signal is compliant with the 480i format. Therefore, the scanning format of the first component video signal Scv1, which is an output from the external device connected to the input terminal 1, is severely limited.

In the long run, in digital television STBs and DVD players, it is expected that component video signals Scv of a plurality of types of scanning formats such as the 480i and 480p formats will be supplied thereto by the same output terminal for providing users with video of various image qualities. The image signal converter ICc, however, cannot meet such expectations.

An object of the present invention is to provide an image signal converter that converts each scanning format of incoming component video signals Scv of a plurality of types of scanning methods from external devices such as digital television STBs and DVD players for correct image display are supplied thereto.

Further, another object of the present invention is to provide an image signal converter that can also support a case in which a luminance signal and a chroma signal obtained based on a composite video signal of a television standard system such as the NTSC system.

DISCLOSURE OF THE INVENTION

To achieve the above objects, the present invention has the following aspects.

A first aspect of the present invention is directed to an image signal converter converting a component video signal of an interlaced scanning format into a signal of a progressive scanning format to display an image on a display device supporting the progressive scanning format. The present invention in accordance with the first aspect comprises an up-converter for up-converting the component video signal of the interlaced scanning format into a signal of the progressive scanning format, a scanning format determination part for determining whether a scanning format of the component video signal is the interlaced scanning format or the progressive scanning format based on a luminance signal included in the component video signal, and an output destination selector for selecting an output destination of the component video signal based on determination of the scanning format determination part. When the scanning format determination part determines that the scanning format is the interlaced scanning format, the component video signal is outputted to the up-converter.

As described above, in the first aspect of the present invention, even if the component video signal of the interlaced scanning format is inputted, such signal is automatically up-converted to a signal of the progressive scanning format, and an image can be appropriately displayed.

According to a second aspect of the present invention, further to the first aspect, the image signal converter further comprises a sync separator for extracting a vertical synchronization signal and a horizontal synchronization signal from the luminance signal included in the component video signal and a sync generator for generating an up-conversion-purpose horizontal synchronization signal and an up-conversion-purpose vertical synchronization signal that are referred to when the up-converter up-coverts the component video signal, based on the extracted horizontal synchronization signal.

According to a third aspect of the present invention, further to the first aspect, the component video signal includes a first component video signal comprising a luminance signal and color-difference signals of two types and a second component video signal comprising a luminance signal and color-difference signals of two types obtained by demodulating a luminance signal and a chroma signal based on a composite video signal of a plurality of television standard systems.

According to a fourth aspect of the present invention, further to the first aspect, the image signal converter further comprises a detector detecting whether the number of scanning lines of the component video signal has been previously assumed. When the detector detects that the number of scanning lines has not been previously assumed, the sync generator generates free-running horizontal and vertical synchronization signals each having a predetermined frequency compliant with the progressive scanning format instead of the vertical synchronization signal and horizontal synchronization signal to prevent synchronization from being unstable on a display screen of the display device.

As described above, in the fourth aspect of the present invention, when an irregular component signal is inputted, image display is made based on a synchronization signal having a predetermined frequency irrespectively of the irregular component signal, thereby protecting the display device.

According to a fifth aspect of the present invention, further to the fourth aspect, the image signal converter further comprises an on-screen display displaying on-screen that the component video signal is invalid when the detector detects that the number of scanning lines has not been previously assumed.

According to a sixth aspect of the present invention, further to the fifth aspect, the detector detects frequencies of the vertical synchronization signal and horizontal synchronization signal extracted by the sync separator and the on-screen display displays the detected frequencies of the vertical synchronization signal and horizontal synchronization signal or the number of scanning lines corresponding thereto when the detector detects that the number of scanning lines has not been previously assumed.

As described above, in the sixth aspect of the present invention, notification of specific information of an irregular input in real time enables the user to take quick and appropriate action.

A seventh aspect of the present invention is directed to a display device for a component video signal image in which the image signal converter in the first through sixth aspect is incorporated.

An eighth aspect of the present invention is directed to a method of converting a component video signal of an interlaced scanning format into a signal of a progressive scanning format to display an image on a display device supporting the progressive scanning format. The invention in accordance with the eighth aspect comprises up-converting the component video signal of the interlaced scanning format into the signal of the progressive scanning format, determining whether a scanning format of the component video signal is the interlaced scanning format or the progressive scanning format based on a luminance signal included in the component video signal and selecting an output destination of the component video signal based on the scanning format determination. When it is determined that the format is the interlaced scanning format, the component video signal in the output destination selection is up-converted.

BRIEF DESCRIPTION OF THE DRAWINGS

FIG. 7 is a diagram illustrative of an on-screen message displayed on the image signal converter shown in FIG. 6.

BEST MODE FOR CARRYING OUT THE INVENTION

The present invention is now described in more detail according to the attached drawings.

First Embodiment

Figure 1:
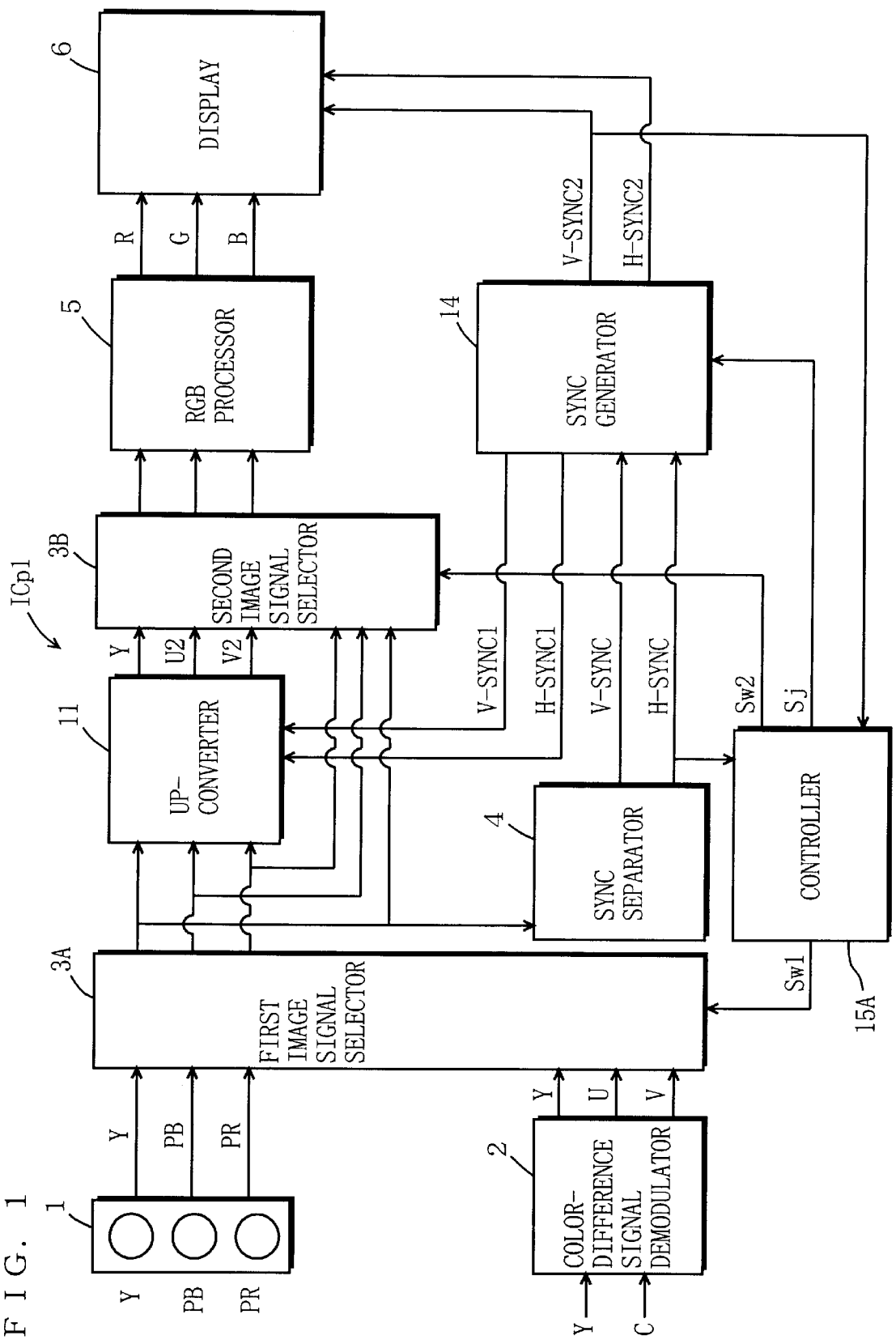
FIG. 1 is a block diagram showing the structure of an image signal converter according to a first embodiment of the present invention.

An image signal converter ICp1 according to a first embodiment of the present invention is described with reference to a block diagram shown in FIG. 1. The image signal converter ICp1 includes an input terminal 1, a color-difference signal demodulator 2, a first image signal selector 3A, a second image signal selector 3B, a sync separator 4, an RGB processor 5, a display 6, an up-converter 11, a sync generator 14, and a controller 15A.

The input terminal 1 receives a first component video signal Scv1 including a luminance signal Y, a color-difference signal PB, and a color-difference signal PR from an external video/audio data source, typically a digital television STB or DVD player. The input terminal 1 then outputs the luminance signal Y, the color-difference signal PB, and the color-difference signal PR to the first image signal selector 3A. Note that, in the present embodiment, the input terminal 1 is supplied with the first component video signal Scv1 compliant with the 480$i$ or 480$p$ format.

The color-difference signal demodulator 2 generates a second component video signal Scv2 including a luminance signal Y, a color-difference signal U (=B−Y) and a color-difference signal V (=R−Y) from a luminance signal Y and a chroma signal C obtained based on a composite video signal of any television standard system (in the present embodiment, the NTSC system). The luminance signal Y, the color-difference signal U and the color-difference signal V (=R−Y) all included in the second component video signal Scv2 are each supplied to the first image signal selector 3A. Note that the luminance signal Y and the chroma signal C supplied to the color-difference signal demodulator 2 are obtained from, for example, an output from a Y/C separator (not shown) after Y/C separation of an NTSC composite video signal or an output of a so-called S terminal of a video tape recorder.

The first image signal selector 3A selectively outputs either the first component video signal Scv1 (Y, PB, PR) received from the input terminal 1 or the second component video signal Scv2 (Y, U, V) received from the color-difference signal demodulator 2 based on a first switching signal Sw1 supplied by the controller 15A.

The sync separator 4 is implemented by a sync separator circuit, which separates and extracts a horizontal synchronization signal H-SYNC and a vertical synchronization signal V-SYNC from the luminance signal Y included in the first or second component video signal Scv1 or Scv2 supplied by the selector 3A.

In response to a user's instruction through a remote controller, the controller 15A generates a first or second switching signal Sw1 or Sw2 for switching the component video signal supplied by the first or second image signal selector 3A or 3B.

Further, the controller 15A counts the number of pulses of the horizontal synchronization signal H-SYNC supplied by the sync separator 4 with reference to a display vertical synchronization signal V-SYNC2 supplied by the sync generator 14 to determine whether the incoming image signal is compliant with the 480$i$ or 480$p$ format method. Based on the determination, the controller 15A generates the above second switching signal Sw2. Based on the second switching signal Sw2, the second image signal selector 3B switches its output to supply an appropriate component video signal to the RGB processor 5.

The sync generator 14 generates synchronization signals for up-converting the 480$i$ format to the 480$p$ based on the horizontal and vertical synchronization signals H-SYNC and V-SYNC from the sync separator 4.

That is, when a judging signal Sj from the controller 15A indicates an interlaced scanning format, the sync generator 14 generates a conversion-purpose horizontal synchronization signal H-SYNC1 and a conversion-purpose vertical synchronization signal V-SYNC1 for up-conversion, which are respectively increased in frequency more than the horizontal and vertical synchronization signals H-SYNC and V-SYNC generated by the sync separator 4. These conversion-purpose horizontal and vertical synchronization signals H-SYNC1 and V-SYNC1 are supplied to the up-converter 11 and also to the display 6 as display-purpose horizontal and vertical synchronization signals H-SYNC2 and V-SYNC2.

On the other hand, when the judging signal Sj indicates a non-interlaced scanning format, the sync generator 14 supplies the synchronization signal H-SYNC and the vertical synchronization signal V-SYNC from the sync separator 4 to the display 6 without any processing as the display-purpose horizontal and vertical synchronization signals H-SYNC2 and V-SYNC2.

Based on the horizontal and vertical synchronization signals H-SYNC1 and V-SYNC1 supplied by the sync generator 14, the up-converter 11 up-converts the first component video signal Scv1 (Y, PB, PR) compliant with the 480$i$ format supplied to the input terminal 1 into a signal compliant with the 480$p$ format.

The second image signal selector 3B selectively outputs to the RGB processor 5 either the image signal (component video signal Scv) supplied by the first image signal selector 3A or an up-converted image signal Scu (Y2, U2, V2) supplied by the up-converter 11 based on the second switching signal Sw2 from the controller 15A.

The RGB processor 5 is implemented by an RGB demodulator circuit, which demodulates the first component video signal Scv1 (Y, PB, PR), the second component video signal Scv2 (Y, U, V), or an up-converted image signal Scu (Y2, U2, V2), and then outputs the original color signals of R, G, and B to the display 6.

The display 6 is preferably implemented by a CRT, which displays an image based on the color signals of R, G, and B supplied by the RGB processor 5.

The operation in the first embodiment is now described.

Based on the instruction from the user's remote controller and the like in advance, the controller 15A provides the first image signal selector 3A with the first switching signal Sw1 to switch the output of the first image signal selector 3A. That is, the output is switched to the input terminal 1 side when the external device such as a digital television STB and DVD player is connected to the input terminal 1, and to the color-difference signal demodulator 2 side when otherwise.

<Output Selection of the Color-difference Signal Demodulator 2 Side>

When the first image signal selector 3A selects inputting to the color-difference demodulator 2, the luminance signal Y and the chroma signal C that are compliant with the 480$i$ format are supplied to the color-difference signal demodulator 2. These signals Y and C are obtained from the output after Y/C separation by the Y/C separator circuit (not shown) or the output of the so-called S terminal of the video tape recorder.

In response, the color-difference signal demodulator 2 demodulates the color-difference signals U and V as well as the luminance signal Y, and then outputs these signals as the second component video signal Scv2. The luminance signal Y and the color-difference signals U and V are supplied to the up-converter 11 through the first image signal selector 3A.

The luminance signal Y supplied by the first image signal selector 3A is also received by the sync separator 4, in which the horizontal and vertical synchronization signals H-SYNC and V-SYNC are extracted therefrom. Note that, in the present embodiment, the frequency of the horizontal synchronization signal H-SYNC is 15.7 KHz, while the frequency of the vertical synchronization signal V-SYNC is 60 Hz. These horizontal and vertical synchronization signals H-SYNC and V-SYNC are supplied to the sync generator 14.

To up-convert the second component video signal of the 480$i$ format into a signal of the 480$p$ format, the sync generator 14 doubles the horizontal synchronization signal H-SYNC in frequency from 15.7 KHz to 31.5 KHz to produce the conversion-purpose horizontal synchronization signal H-SYNC. This conversion-purpose horizontal synchronization signal H-SYNC1 is supplied to the up-converter 11, and also to the display 6 as the display-purpose horizontal synchronization signal H-SYNC2.

Similarly, the sync generator 14 generates the vertical synchronization signal V-SYNC1. The sync generator 14 then outputs V-SYNC1 to the up-converter 11, and also to the display 6 as the displaying-purpose vertical synchronization signal V-SYNC2.

The frequencies of the conversion-purpose and display-purpose horizontal synchronization signals H-SYNC1 and H-SYNC2 are both 31.5 KHz. The frequencies of the conversion-purpose and display-purpose vertical synchronization signals V-SYNC1 and V-SYNC2 are both 60 KHz. Note that the conversion-purpose horizontal and vertical synchronization signals H-SYNC1 and V-SYNC1 each have the phase and waveform suitable for up-conversion by the up-converter 11. Also, the display-purpose horizontal and vertical synchronization signals H-SYNC2 and V-SYNC2 each have the phase and waveform suitable for deflection in the display 6.

The up-converter 11 up-converts the second component video signal Scv2 (Y, U, V) into the one compliant with the 480$p$ format based on the conversion-purpose horizontal and vertical synchronization signals H-SYNC1 and V-SYNC1 to generate the up-converted image signal Scu (Y2, U2, V2). The up-converter 11 then supplies the generated up-converted image signal Scu (Y2, U2, V2) to the second image signal selector 3B.

Note that, in general, if the input signal indicates a motion picture, the up-converter 11 doubles the number of scanning lines by interpolating a signal between two scanning lines based on the signal representing two scanning lines for each field. If the input signal indicates a still picture, the up-converter 11 generates a frame signal that enables image display with higher definition than two field signals.

To select the second component video signal Scv2 supplied by the color-difference signal demodulator 2, the controller 15A provides the first switching signal Sw1 to the first image signal selector 3A. At the same time, the controller 15A supplies the second switching signal Sw2 to the second image signal selector 3B for outputting the up-converted image signal Scu (Y2, U2, V2) from the up-converter 11 side to the RGB processor 5.

Therefore, the up-converted image signal Scu (Y2, U2, and V2) passing through the second image signal selector 3B is converted into signals of primary colors R, G, and B in the RGB processor 5, and then supplied to the display 6.

At this time, the display 6 is supplied with the display-purpose horizontal and vertical synchronization signals H-SYNC2 and V-SYNC2. Therefore, optimal scanning of each of the above signals of the primary colors R, G, and B is performed. As a result, an image of the NTSC video signal originally compliant with the 480$i$ format is displayed in the 480$p$ format.

<Output Selection of the Input Terminal 1 Side>

When the first image signal selector 3A selects the input terminal 1 side, the first component video signal Scv1 (Y, PB, PR) from the external device such as a digital television STB and DVD player through the input terminal 1 further passes through the first image signal selector 3A to the up-converter 11.

Also, the luminance signal Y included in the first component video signal Scv1 (Y, PB, PR) is supplied to the sync separator 4. Based on the luminance signal Y, the sync separator 4 extracts the horizontal and vertical synchronization signals H-SYNC and V-SYNC.

The controller 15A counts the number of pulses of the horizontal synchronization signal H-SYNC supplied by the sync separator 4 with reference to the display-purpose vertical synchronization signal V-SYNC2 received from the sync generator 14.

When the received first component video signal Scv1 (Y, PB, PR) is compliant with the 480$i$ format, the frequency of the horizontal synchronization signal H-SYNC is 15.7 Hz, while the frequency of the vertical synchronization signal V-SYNC is 60 Hz. Therefore, the controller 15A determines that the first component video signal Scv1 of the 480$i$ format is supplied thereto when counting to 240 valid display scanning lines within one vertical period.

On the other hand, when the received first component video signal Scv1 is compliant with the 480$p$ format, the frequency of the horizontal synchronization signal H-SYNC is 31.5 Hz, while the frequency of the vertical synchronization signal V-SYNC is 60 Hz. Therefore, the controller 15A determines that the first component video signal Scv1 of the 480p format is supplied thereto when counting to 480 valid display scanning lines within one vertical period.

When the controller 15A determines that the signal of the 480i format is supplied thereto, the controller 15A outputs the second switching signal Sw2 to cause the second image signal selector 3B to be connected to the output stage of the up-converter 11. The controller 15A further controls the sync generator 14. To up-convert the second component video signal Scv2 of the 480i format into the one of the 480p format, the sync generator 14 doubles the horizontal synchronization signal H-SYNC in frequency from 15.7 KHz to 31.5 KHz to produce the conversion-purpose and display-purpose horizontal synchronization signals H-SYNC1 and H-SYNC2. Similarly, the sync generator 14 produces the conversion-purpose and display-purpose vertical synchronization signals V-SYNC1 and V-SYNC2.

Then, the conversion-purpose horizontal and vertical synchronization signals H-SYNC1 and V-SYNC1 are supplied to the up-converter 11, while the display-purpose horizontal and vertical synchronization signals H-SYNC2 and V-SYNC2 are supplied to the display 6. Note that the frequencies of the conversion-purpose synchronization signal V-SYNC1 and the display-purpose vertical synchronization signal V-SYNC2 supplied by the sync generator 14 are both 60 Hz.

Thereafter, the procedure from the up-converter 11 to the display 6 for display is similar to that in the above described case where the luminance signal Y and the chroma signal C are supplied to the color-difference demodulator 2.

On the other hand, when the controller 15A determines in the above described manner that the first component video signal Scv1 of the 480p format is supplied thereto, the up-converter 11 does not have to perform up-conversion. In this case, the controller 15A outputs the second switching signal Sw2 for controlling the second image signal selector 3B to be connected to the first image signal selector 3A side.

Therefore, the first component video signal Scv1 (Y, PB, PR) is supplied to the RGB processor 5 through the first and then second image signal selectors 3A and 3B. The RGB processor 5 converts the received first component video signal Scv1 (Y, PB, PR) into signals of primary colors R, G, B, and then outputs these signals to the display 6.

Further, the sync separator 4 sync-separates the horizontal and vertical synchronization signals H-SYNC and V-SYNC from the luminance signal Y included in the first component video signal Scv1 (Y, PB, PR) that has passed through the first image signal selector 3A. The separated horizontal and vertical synchronization signals H-SYNC and V-SYNC are supplied to the sync generator 14.

The sync generator 14 generates the display-purpose horizontal and vertical synchronization signals H-SYNC2 and V-SYNC2 based on the horizontal and vertical synchronization signals H-SYNC and V-SYNC. The frequency of the display-purpose horizontal synchronization signal H-SYNC2 is 31.5 KHz, which is the same as that of the horizontal synchronization signal H-SYNC from the sync separator 4. The frequency of the display-purpose vertical synchronization signal V-SYNC2 is 60 Hz, which is the same as that of the vertical synchronization signal V-SYNC from the sync separator 4. These display-purpose horizontal and vertical synchronization signals H-SYNC2 and V-SYNC2 are supplied to the display 6.

If the first component video signal Scv1 of the 480p format is inputted, up-conversion is not required. Therefore, in this case, the conversion-purpose horizontal and vertical synchronization signals H-SYNC1 and V-SYNC1 are not supplied by the sync generator 14 to the up-converter 11.

As described above, for the first component video signal Scv1 originally of the 480p format, images are displayed on the display 6 in the 480p format. In this way, according to the user's selection, the controller 15A appropriately switches between the first and second image signal selectors 3A and 3B and also appropriately controls the up-converter 11. It is thus possible to automatically convert the image signal into the one in a required scanning format and to display images.

Second Embodiment

Next, an image signal converter according to a second embodiment of the present invention is described with reference to FIGS. 2 and 3. In the image signal converter ICp1, it is assumed that only a 480i or 480p signal is inputted to the input terminal 1. In an image signal converter ICp2, however, it is assumed that signals other than those of the 480i or 480p format can be inputted to the input terminal 1. Under such assumption, as shown in a block diagram of FIG. 2, the image signal converter ICp2 has the structure in which the controller 15A of the image signal converter ICp1 shown in FIG. 1 is partly modified in structure into a controller 15B and a mode table 17 is newly added.

In other words, in a digital television era, it is expected that component video signals of different scanning formats from an STB and the like may be inputted to the same input terminal. For example, in addition to the 480i and 480p formats, there are various formats such as an interlaced scanning format of approximately 1080 valid display scanning lines per frame (hereinafter referred to as "1080i format"), a progressive scanning format of approximately 1080 scanning lines per frame (hereinafter referred to as "1080p format"), a progressive scanning format of approximately 720 scanning lines per frame (hereinafter referred to as "720p format"). In the United States, approximately eighteen scanning formats of digital broadcasting are currently available.

In view of these circumstances, in the second embodiment, data to be referred to for determining whether the first component video signal to the input terminal 1 is normal is previously stored in the mode table 17. That is, the data stored in the mode table 17 indicates that the input is normal if the number of scanning lines of the received first component video signal Scv1 (Y, PB, PR) is equal to that of the signal of the previously assumed scanning format (480i or 480p), and that the input is irregular otherwise (1080i, 1080p, or 720p, for example). In other words, in the mode table 17, the numbers of inputs of horizontal synchronization signal in one vertical synchronizing period and data indicating each number of inputs is normal or irregular are previously stored in table form.

On the other hand, the controller 15B is so constructed as to refer to the mode table 17 to determine whether the first component video signal Scv1 (Y, PB, PR) to the input terminal 1 is normal or irregular. The structure of the other components are similar to those in the first embodiment shown in FIG. 1.

Similarly to the first embodiment, the controller 15B counts the number of pulses of the horizontal synchronization signal H-SYNC from the sync separator 4 in one vertical synchronizing period with reference to the vertical synchronization signal V-SYNC2 from the sync generator 14.

That is, the number of pulses of horizontal synchronization signal in one vertical synchronizing period is 525 for the 480p format, and 262 or 263 for the 480i format. These are originally assumed as normal inputs. If the input signal is compliant with the 1080i format, which is not assumed herein, the number of pulses is 562 or 563 in one vertical synchronizing period. Further, if the input signal is compliant with the 720p format, the number is 750.

The controller 15B determines whether the number of pulses is normal based on the data stored in the mode table 17. If normal, the controller 15B performs the similar operation to that in the first embodiment.

On the other hand, if the number of pulses is irregular, images cannot be correctly displayed. Therefore, the controller 15B performs protecting operation for the circuits in a deflection system.

The protecting operation is now described with reference to a flow chart shown in FIG. 3. An example of processing when the edge of the horizontal synchronization signal H-SYNC is inputted to the controller 15B as an interrupt signal is shown in FIG. 3. When an interrupt occurs, in step S100, various flags for checking an input mode are cleared. The procedure then goes to the next step S102.

In step S102, the number of counts by a horizontal sync counter (not shown) incorporated in the controller 15B is read. The procedure-then goes to the next step S104.

In step S104, the number of counts read in step S102 is compared with the data stored in the mode table 17. The procedure then goes to the next step S106.

In step S106, it is determined that the first component video signal Scv1 is compliant with the 480i or 480p format, or another format. If it is determined that the signal is compliant with the 480i format, the procedure goes to step S108. If the 480p format, the procedure goes to step S110. If another format, for example, 1080i format, the procedure goes to step S114.

In step S108, an input mode flag F480i indicating the 480i format is set ON. The procedure then goes to step S114.

In step S110, an input mode flag F480p indicating the 480p format is set ON. The procedure then goes to step S114.

In step S112, an irregular flag Fir indicating an irregular format is set ON. The procedure then goes to step S114.

In step S114, the horizontal sync counter is cleared, and then the interrupt service ends.

The controller 15B detects the input flag during a normal operation mode after a vertical interrupt mode. Then, if the input mode flag F480i or F480p is ON, the controller 15B performs processing according to the 480i or 480p format, respectively. Since this processing is the same as described in the first embodiment, its detailed description is omitted herein.

On the other hand, if the irregular flag Fir is ON, the controller 15B generates a synchronization signal generation instructing signal Ss for the sync generator 14 to generate a free-running synchronization signal.

Based on the synchronization signal generation instructing signal Ss, the sync generator 14 generates a free-running synchronization signal Ssy (not shown) compliant with the 480p format irrespectively of the horizontal and vertical synchronization signals H-SYNC and V-SYNC from the sync separator 4. The sync generator 14 then outputs the free-running synchronization signal Ssy to the display 6 as the display-purpose horizontal and vertical synchronization signals H-SYNC2 and V-SYNC2.

As a result, the circuits of the deflection system are protected by preventing instability in synchronization on the display screen of the display 6. Also, the RGB processor 5 is controlled to perform blanking.

Third Embodiment

An image signal converter according to a third embodiment of the present invention is now described with reference to FIGS. 4 and 5. Note that, also in the present embodiment, as similarly to the second embodiment, it is assumed that the first component video signal Scv of a format other than the 480i or 480p can be inputted to the input terminal 1.

Further, in an image signal converter ICp3 according to the present embodiment, an on-screen display (hereinafter referred to as "OSD") 19 is added to the image signal converter ICp2 shown in FIG. 2, and the controller 15B is modified to a controller 15C.

When the controller 15C determines that a signal of a format other than the 480i or 480p format is inputted, the OSD 19 displays thereon an on-screen message indicative of the determination result. The controller 15C has a function of on-screen control to the above OSD 19 in addition to the functions included in the controller 15B according to the second embodiment.

Figure 2:
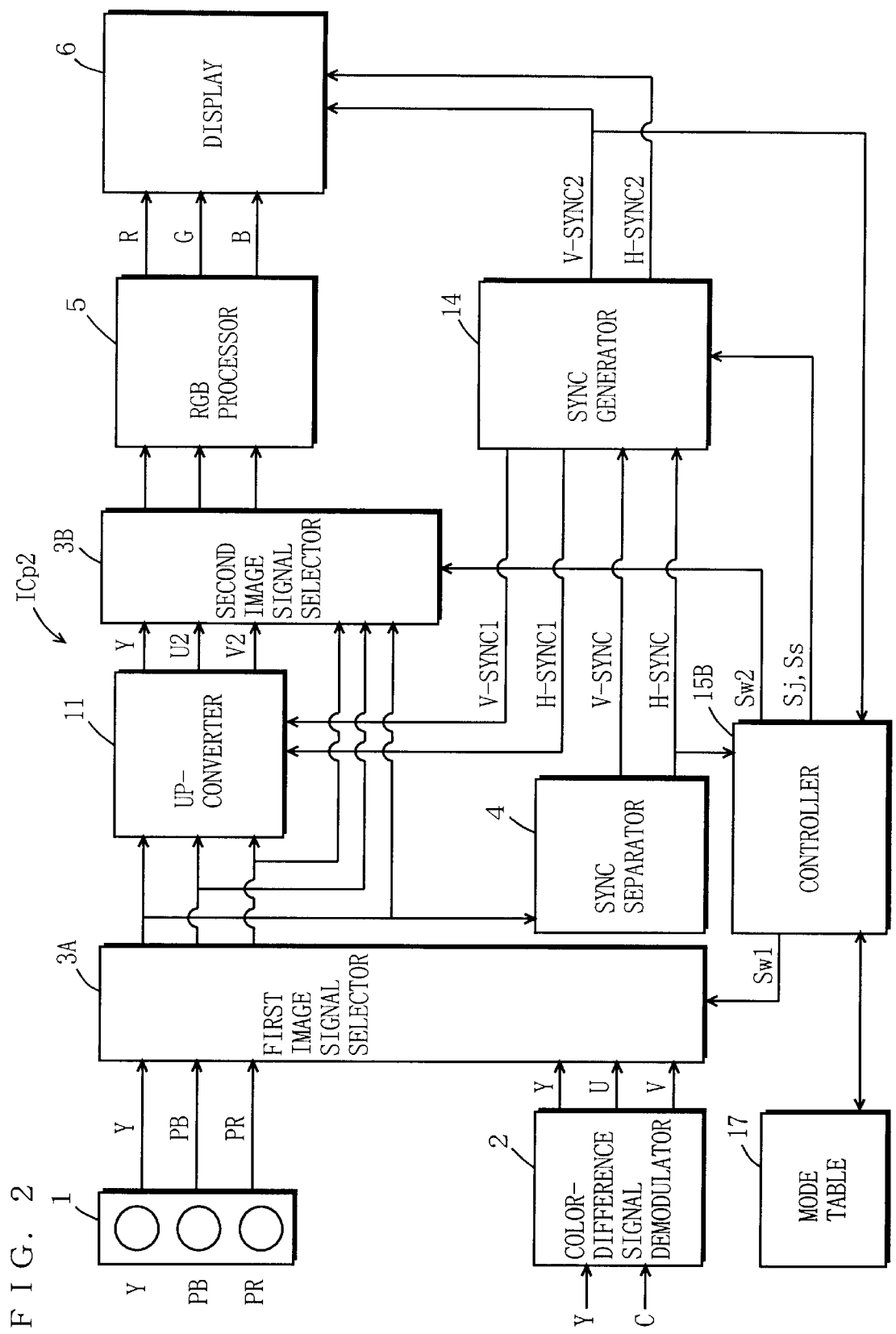
FIG. 2 is a block diagram showing the structure of an image signal converter according to a second embodiment of the present invention.
Figure 3:
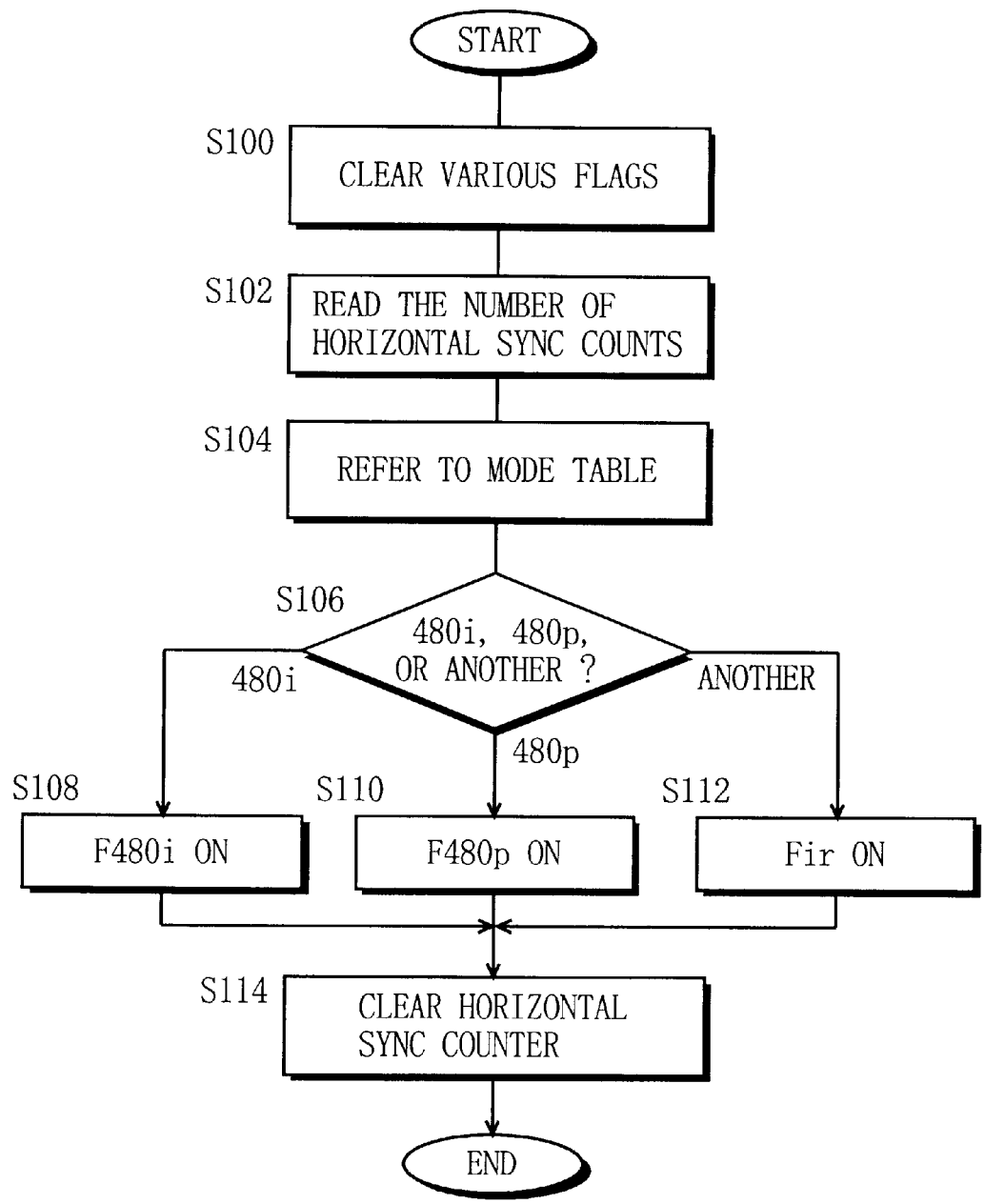
FIG. 3 is a flow chart showing the operation of a controller of the image signal converter shown in FIG. 2.

The other structure is similar to that of the image signal converter ICp2 shown in FIG. 2. Note that the controller 15C basically performs control operation similar to that of the controller 15B. As described referring to the flow chart of FIG. 3, when it is determined that an irregular input such as 1080i is present, the controller 15C immediately sets the flag indicating the irregular input ON. The controller 15C then causes the sync generator 14 to generate the free-running synchronization signal Ssy compliant with the 480p format, irrespectively of the horizontal and vertical synchronization signals H-SYNC and V-SYNC from the sync separator 4. The controller 15C then further generates an OSD control signal So for the OSD 19 to display an on-screen message.

Based on the OSD control signal So, the OSD 19 outputs a switching signal YS to the RGB processor 5 for selectively receiving R, G, and B signals from the OSD 19. On the other hand, the controller 15C outputs predetermined message display data Sr (R, G, B) to the RGB processor 5.

Figure 5:
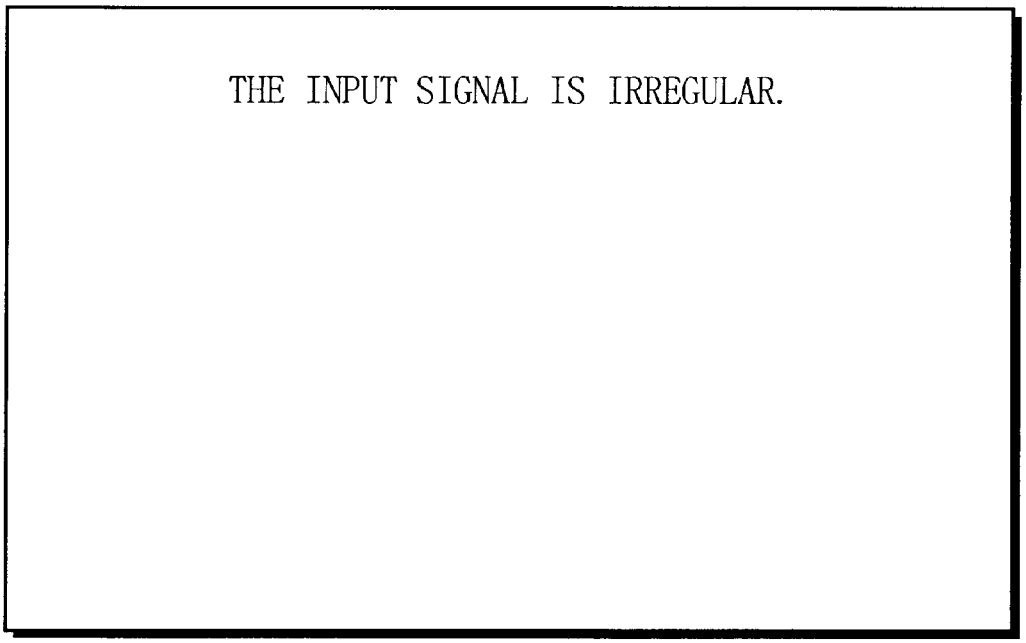
FIG. 5 is a diagram illustrative of an on-screen message displayed on the image signal converter shown in FIG. 4.

As a result, as shown in FIG. 5, the entire screen is displayed in arbitrary color, and a message such as "The input signal is irregular" is displayed on the display 6 in order to indicate the irregular input.

Fourth Embodiment

Figure 6:
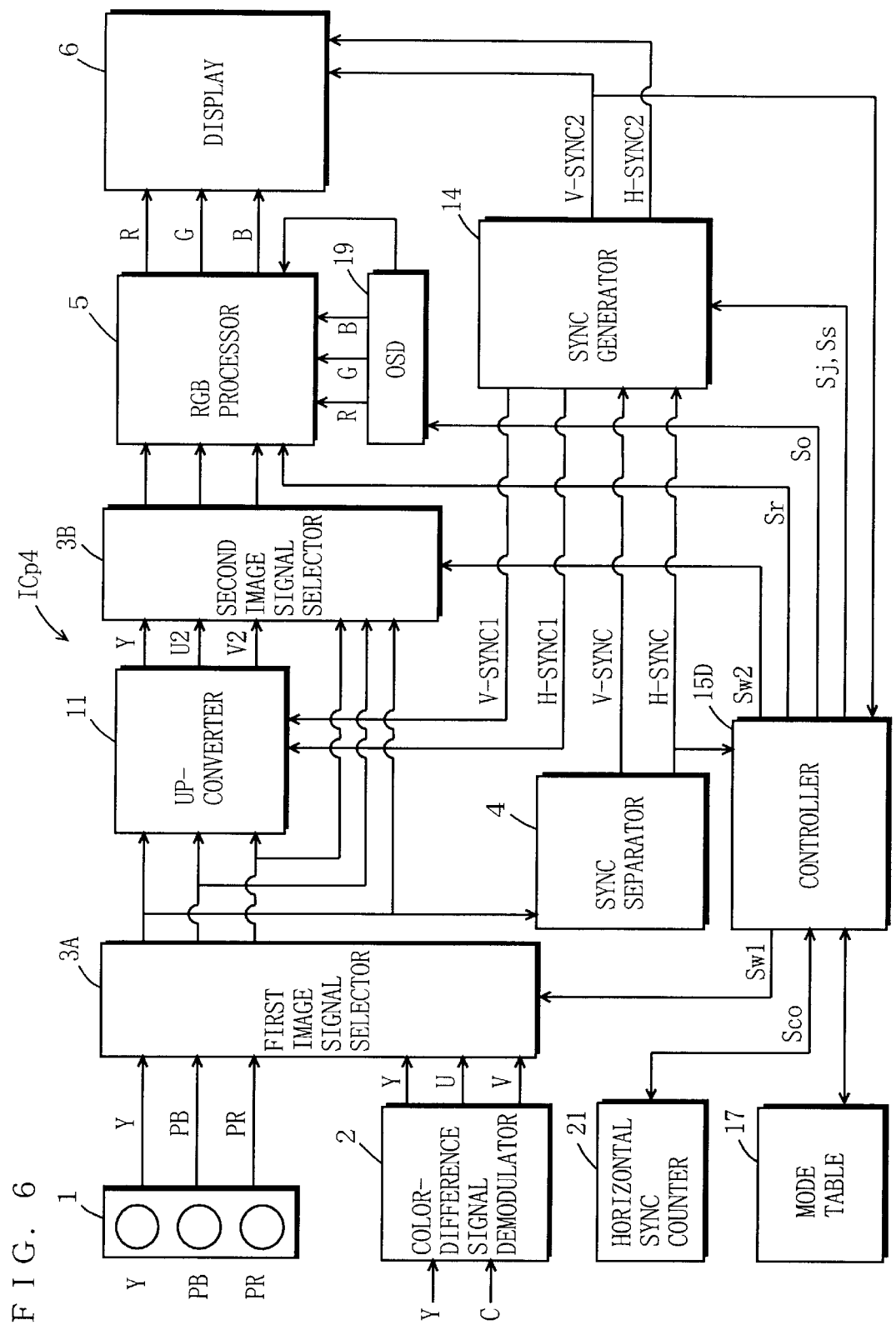
FIG. 6 is a block diagram showing the structure of an image signal converter according to a fourth embodiment of the present invention.
Figure 8:
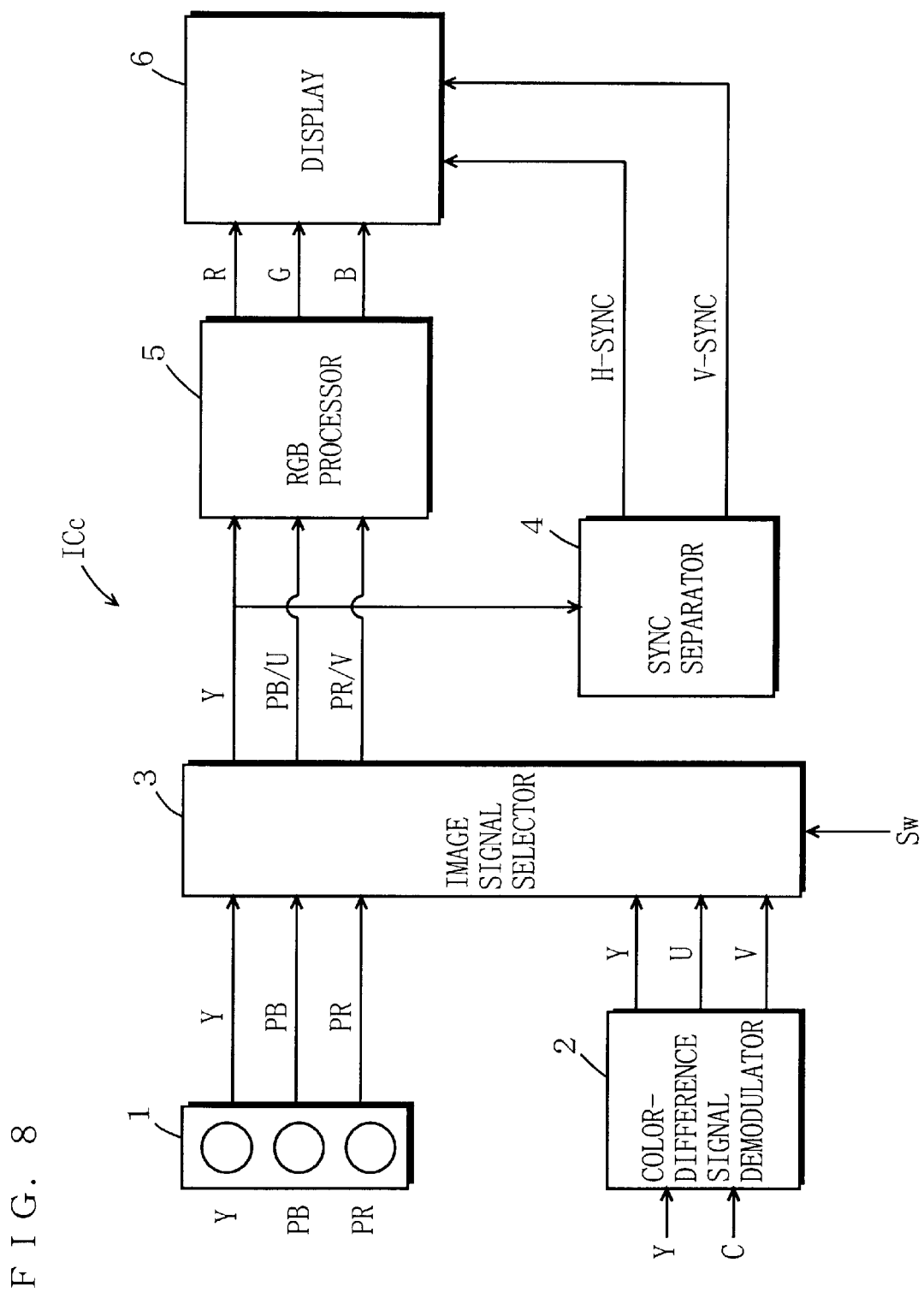
FIG. 8 is a block diagram showing the structure of a conventional image display device.

An image signal converter according to a fourth embodiment of the present invention is now described with reference to FIGS. 6 and 7. Also in the present embodiment, similarly to the second and third embodiments, it is assumed that a signal of a format other than the 480i or 480p format can be inputted to the input terminal 1.

Figure 4:
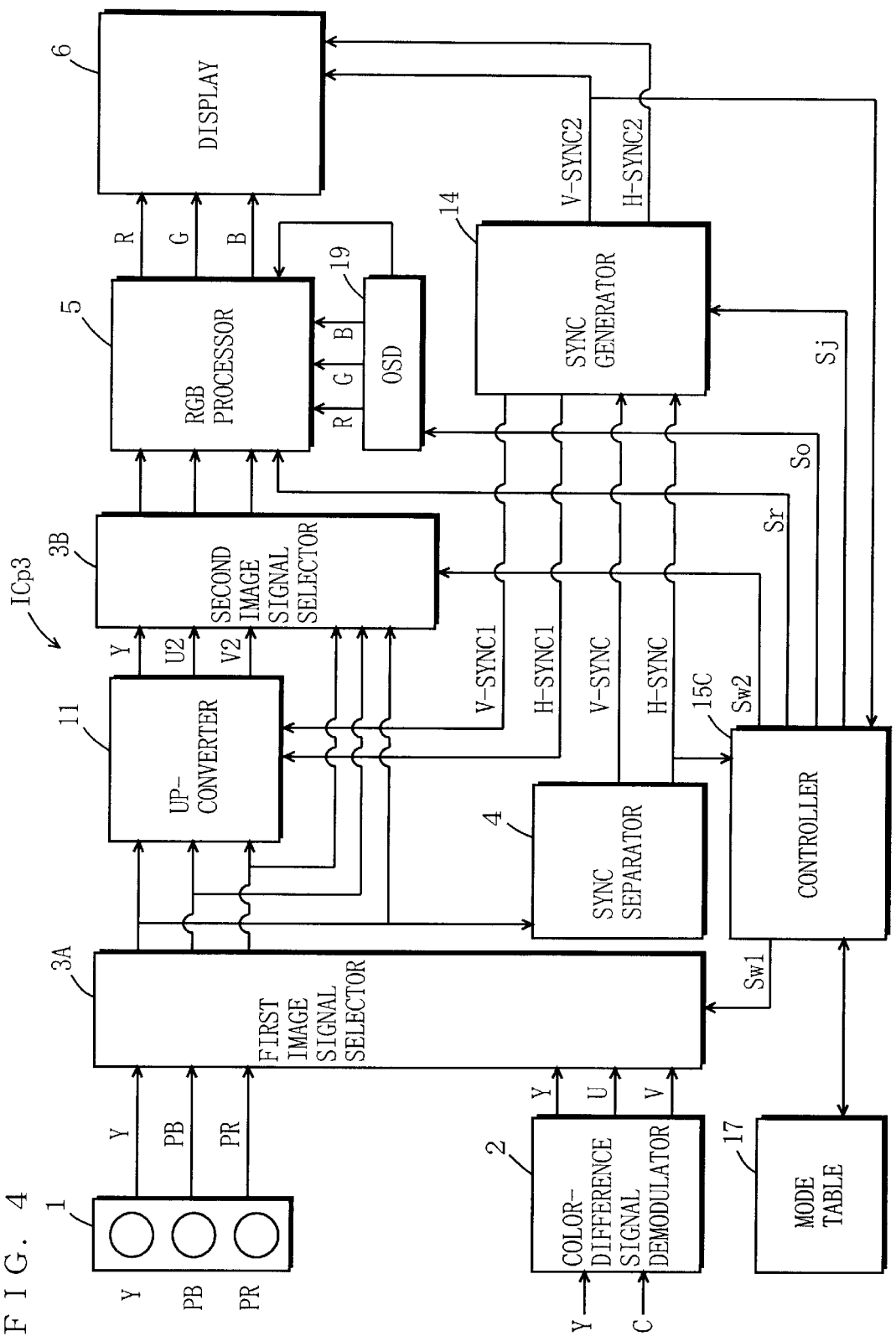
FIG. 4 is a block diagram showing the structure of an image signal converter according to a third embodiment of the present invention.

Further, an image signal converter ICp4 according to the present embodiment has the structure in which a horizontal sync counter 21 is newly added to the image signal converter ICp3 shown in FIG. 4 and the controller 15C is modified to a controller 15D.

The horizontal sync counter 21 counts the frequency of the horizontal synchronization signal H-SYNC by an internal clock. Further, in addition to the functions included in the controller 15C, the controller 15D has a function of detecting the frequency of the horizontal synchronization signal received from the sync separator 4 based on the count value of the horizontal sync counter 21. The other structure is similar to that in the third embodiment shown in FIG. 4.

The controller 15D basically performs control operation similar to that of the controller 15C according to the above third embodiment. However, when the edge of the horizontal synchronization signal H-SYNC from the sync separator 4 is detected, the controller 15D activates, in response, the horizontal sync counter 21 to start counting of the internal clock in the controller 15D.

When another horizontal synchronization signal H-SYNC is inputted to the controller 15D again as an interrupt, the controller 15D reads a count value Sco of the horizontal sync counter 21. In response to this reading of the count value, the count value of the horizontal sync counter 21 is cleared, and anther counting starts.

Here, the count value Sco read from the horizontal sync counter 21 multiplied by the frequency of the internal clock equals the frequency of the horizontal synchronization signal H-SYNC. Further, the frequency of the horizontal synchronization signal H-SYNC multiplied by the number of scanning lines equals the frequency of the vertical synchronization signal V-SYNC.

The controller 15D compares each of the above obtained frequencies of the horizontal and vertical synchronization signals H-SYNC and V-SYNC with the data previously registered in the mode table 17. If the input is compliant with the 480*i* or 480*p* format, the controller 15D determines that the input is normal, and performs processing similar to that in the third embodiment.

On the other hand, if the input is irregular, the controller 15D performs processing as follows. That is, if the input is irregular but of a format previously registered in the mode table 17 such as the 1080*i* or 720*p* format, the controller 15D controls the OSD 19 to make the switching signal YS to the on-screen side valid for the entire screen. The controller 15D further causes format information to be displayed on the screen of the display 6 with a message MSG1 as shown in FIG. 7, for example. If the input is compliant with a format not previously registered in the mode table 17, the frequency values of the horizontal and vertical synchronization signals of the received first component video signal Scv1 are displayed as a message MSG2 exemplarily shown in FIG. 7. Alternatively, the number of scanning lines may be displayed instead of the frequency values.

The device such as an STB for outputting a component video signal may supply signals of a plurality of scanning formats to the same terminal. In such case, if the user has not connected the device correctly, he/she can be notified on screen as such. As a result, the user can immediately notice and handle connection errors. This notifying function is quite effective.

Note that, in the above first to fourth embodiments, it is assumed that the luminance signal Y and chroma signal C obtained based on the NTSC composite video signal are supplied to the color-difference signal demodulator 2. However, the input signals are not limited to these signals, and may be the luminance signal Y and chroma signal C based on the composite video signal of other television standard system, typically a PAL system.

Further, in the above first to fourth embodiments, to detect the number of scanning lines of the incoming component video signal or detect the frequency thereof, the controllers 15B, 15C, and 15D preferably average a plurality of detection results in order to reduce errors due to interference such as noise. This averaging can prevent these controllers from being extremely unstable due to changes of setting for every detection.

As described above, the present invention has the following effects:

(1) When component video signals of different scanning formats such as the 480*i* and 480*p* formats are inputted to the same component video input terminal, their formats are automatically determined. Then, the signal of the 480*i* format is up-converted by an up-converter, while the signal of the 480*p* format is outputted as it is without up-conversion. Therefore, the present image signal converter has an excellent function of supporting each image signal of a different format.

Furthermore, the image signal converter can support a Y (luminance) signal and a C (chroma) signal of the NTSC system.

(2) When a signal of a scanning format that is different from the 480*i* and 480*p* format is inputted to the component video terminal, the present image signal converter immediately detects such input and automatically switches to the internal synchronization signal. Therefore, it is possible to protect the deflection circuits for a display and other circuits.

(3) When a signal not assumed in advance is inputted, the user is automatically notified by a warning message through the on-screen display function. Therefore, the user can immediately recognize connection errors and the like.

(4) Since the frequency of the incoming component video signal is automatically determined, it is possible to provide a more user-friendly display device.

(5) As to the display devices such as television receivers that are connected to devices such as STBs, devices supporting the 480*i* or 480*p* format that are equivalent to the conventional ones will be mainstream for the time being in view of cost. However, in the future, signals of the 1080*i*, 720*p*, and other formats might be supplied by the same output terminal of an STB or the like. Thus, the present invention is quite effective for smoothly getting digital television broadcasting into widespread use or using digital television broadcasting at low cost.

INDUSTRIAL APPLICABILITY

As described above, the present invention can be applied to image display typically on a television to which component video signals of different scanning formats are inputted from an external device such as a digital television STB and DVD player.

What is claimed is:

1. An image signal converter operable to convert a component video signal of an interlaced scanning format into a signal of a progressive scanning format to display an image on a display device supporting the progressive scanning format, said image signal converter comprising:

scanning format determination means for determining whether a scanning format of the component video signal is the interlaced scanning format or the progressive scanning format based on a luminance signal included in the component video signal;

up-convert means for up-converting the component video signal into an up-converted signal of the progressive scanning format;

selection means for receiving the up-converted signal and the component video signal and for selecting one of the up-converted signal and the component video signal based on a determination of said scanning format determination means;

detection means for detecting whether the number of scanning lines of the component video signal has been previously assumed; and sync generation means for generating an up-conversion-purpose horizontal synchronization signal and an up-conversion-purpose vertical synchronization signal that are referred to when said up-conversion means up-coverts the component video signal, based on the extracted horizontal synchronization signal, wherein, when said scanning format determination means determines that the scanning format is the interlaced scanning format, said selection means selects the up-converted signal, and wherein, when said detection means detects that the number of scanning lines has not been previously assumed, said sync generation means generates free-running horizontal and vertical synchronization signals each having a predetermined frequency compliant with the progressive scanning format instead of the vertical synchronization signal and horizontal synchronization signal to prevent synchronization from being unstable on a display screen of the display device.

2. The image signal converter as claimed in claim 1, further comprising on-screen display means for displaying on-screen that said component video signal is invalid when said detection means detects that the number of scanning lines has not been previously assumed.

3. The image signal converter as claimed in claim 2, further comprising:

sync separation means for extracting a vertical synchronization signal and a horizontal synchronization signal from the luminance signal included in the component video signal, wherein said detection means is operable to detect frequencies of the vertical synchronization signal and horizontal synchronization signal extracted by said sync separation means, and wherein said on-screen display means is operable to display the detected frequencies of the vertical synchronization signal and horizontal synchronization signal or the number of scanning lines corresponding thereto when said detection means detects that the number of scanning lines has not been previously assumed.

4. A display device for a component video signal image, said display device comprising:

an image display;

an image signal converter operable to convert a component video signal of an interlaced scanning format into a signal of a progressive scanning format to display an image on a display device supporting the progressive scanning format, said image signal converter including scanning format determination means for determining whether a scanning format of the component video signal is the interlaced scanning format or the progressive scanning format based on a luminance signal included in the component video signal, up-convert means for up-converting the component video signal into an up-converted signal of the progressive scanning format, and selection means for receiving the up-converted signal and the component video signal and for selecting one of the up-converted signal and the component video signal based on a determination of said scanning format determination means, detection means for detecting whether the number of scanning lines of the component video signal has been previously assumed; and sync generation means for generating an up-conversion-purpose horizontal synchronization signal and an up-conversion-purpose vertical synchronization signal that are referred to when said up-conversion means up-coverts the component video signal, based on the extracted horizontal synchronization signal, wherein, when said scanning format determination means determines that the scanning format is the interlaced scanning format, said selection means selects the up-converted signal, and wherein, when said detection means detects that the number of scanning lines has not been previously assumed, said sync generation means generates free-running horizontal and vertical synchronization signals each having a predetermined frequency compliant with the progressive scanning format instead of the vertical synchronization signal and horizontal synchronization signal to prevent synchronization from being unstable on a display screen of the display device.

5. A display device for a component video signal image as claimed in claim 4, further comprising on-screen display means for displaying on-screen that said component video signal is invalid when said detection means detects that the number of scanning lines has not been previously assumed.

6. A display device for a component video signal image as claimed in claim 5, further comprising:

sync separation means for extracting a vertical synchronization signal and a horizontal synchronization signal from the luminance signal included in the component video signal, wherein said detection means is operable to detect frequencies of the vertical synchronization signal and horizontal synchronization signal extracted by said sync separation means, and wherein said on-screen display means is operable to display the detected frequencies of the vertical synchronization signal and horizontal synchronization signal or the number of scanning lines corresponding thereto when said detection means detects that the number of scanning lines has not been previously assumed.

* * * * *